United States Patent [19]

Ikegami et al.

[11] 4,451,573
[45] May 29, 1984

[54] CATALYST FOR POLYMERIZATION OF OLEFINS

[75] Inventors: Tadashi Ikegami; Katsuhiko Takaya; Haruyuki Yoneda, all of Kurashiki, Japan

[73] Assignee: Asahi Kasei Kogyo Kabushiki Kaisha, Osaka, Japan

[21] Appl. No.: 385,221

[22] Filed: Jun. 4, 1982

[30] Foreign Application Priority Data

Jun. 2, 1981 [JP] Japan .................................. 56-83828
Jun. 3, 1981 [JP] Japan .................................. 56-84308
Jul. 1, 1981 [JP] Japan .................................. 56-101308

[51] Int. Cl.³ .......................... C08F 4/64; C08F 4/68; C08F 4/62
[52] U.S. Cl. .................... 502/113; 502/115; 502/116; 502/117; 526/114; 526/127; 526/129; 526/132; 526/139; 526/141; 526/150
[58] Field of Search ............... 252/429 B, 429 C, 430; 502/113, 115, 116, 117

[56] References Cited

U.S. PATENT DOCUMENTS 3,635,840  1/1972  Hinton ................................ 252/430
3,876,554  4/1975  Pullukat .......................... 252/430 X
3,884,832  5/1975  Pullukat et al. ................. 252/429 C
4,041,225  8/1977  Pullukat .......................... 252/430 X
4,368,302  1/1983  Downs ............................. 252/430 X Primary Examiner—Patrick Garvin Attorney, Agent, or Firm—Sprung, Horn, Kramer & Woods

[57] ABSTRACT

A catalyst suitable for use in the polymerization of olefins is disclosed. This catalyst contains:

[A] a solid catalyst component obtained by calcining a reaction product of (a) at least one compound selected from an amine compound, a phosphoric acid amide, a hydrocarbyloxy compound of titanium, vanadium, hafnium or zirconium, and a germanium compound having the general formula:

$$R^1R^2R^3R^4Ge$$

wherein (i) $R^1$, $R^2$ and $R^3$ are each independently a hydrocarbon group having 1 through 10 carbon atoms, and $R^4$ is a hydrogen atom, a halogen atom, a —OH group, or a —OGeR¹R²R³ group, or (ii) $R^1$, $R^2$, $R^3$ and $R^4$ are each independently —OR⁵ wherein $R^5$ is a hydrocarbon group having 1 through 10 carbon atoms, or a halogen atom, and a tin compound having the general formula:

$$R^1R^2R^3R^6Sn$$

wherein $R^1$, $R^2$ and $R^3$ are the same as defined above and $R^6$ is a halogen atom, or —OH group, with (b) at least one chromium compound, said reaction product being supported on an inorganic oxide carrier; and

[B] an organometallic compound component.

22 Claims, No Drawings

CATALYST FOR POLYMERIZATION OF OLEFINS

The present invention relates to a catalyst suitable for use in the production of olefin, especially ethylene, polymers or copolymers by the polymerization of ethylene, or components containing, as a main constituent, ethylene.

U.S. Pat. No. 3,752,795 discloses a process for polymerizing polyolefins in the presence of (i) chromyl bis(-triorganotitanates) having the general formula:

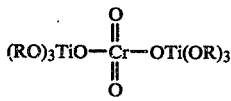

wherein R is an alkylalkaryl, aryl or cycloalkyl group and (ii) an organoaluminum compound. Furthermore, Japanese Patent Application Laid-Open (Kokai) No. 51-116192/1976 discloses the combined use of a catalyst comprising a solid inorganic supporting material having a surface hydroxyl group, a reaction product of chromium trioxide and a phosphorus compound, and an aluminum compound with a reducing agent (e.g. a boron compound).

An object of the present invention is to provide a catalyst suitable for use in the polymerization of olefins, which catalyst has a high activity and is capable of producing olefin polymers or copolymers having an excellent melt flowability.

Other objects and advantages of the present invention will be apparent from the description set forth hereinbelow.

In accordance with the present invention, there is provided a catalyst for polymerizing olefins comprising:

A a solid catalyst component obtained by calcining a reaction product of
(a) at least one compound selected from an amine compound, a phosphoric acid amide, a hydrocarbyloxy compound of titanium, vanadium, hafnium or zirconium, and a germanium compound having the general formula:

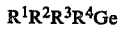

wherein (i) $R^1$, $R^2$ and $R^3$ are each independently a hydrocarbon group having 1 through 10 carbon atoms, and $R^4$ is a hydrogen atom, a halogen atom, —OH group, or —OGe$R^1R^2R^3$ group or (ii) $R^1$, $R^2$, $R^3$ and $R^4$ are each independently —OR$^5$ wherein $R^5$ is a hydrocarbon group having 1 through 10 carbon atoms, or a halogen atom, and a tin compound having the general formula:

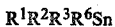

wherein $R^1$, $R^2$ and $R^3$ are the same as defined above and $R^6$ is a halogen atom, or —OH group, with (b) at least one chromium compound, said reaction product being supported on an inorganic oxide carrier; and (B) an organometallic compound component selected from the following groups (1) through (5):
(1) a hydrocarbon-soluble organomagnesium component having the general formula:

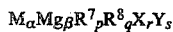

wherein M is an element selected from aluminum, boron, beryllium, zinc or lithium; $R^7$ and $R^8$ are the same or different hydrocarbon groups having 1 to 20 carbon atoms; X and Y are the same of different groups selected from O$R^7$, OSi$R^{10}R^{11}R^{12}$, N$R^{13}R^{14}$, or S$R^{15}$ wherein $R^9$, $R^{10}$, $R^{11}$, $R^{12}$, $R^{13}$, and $R^{14}$ are independently hydrogen atom, or a hydrocarbon group having 1 to 20 carbon atoms, and $R^{15}$ is a hydrocarbon group having 1 to 20 carbon atoms; $\alpha$ is zero or greater than zero, $\beta$ is greater than zero, and p, q, r, and s are each zero or greater than zero and both p and q are not zero at the same time and have the relationship $p+q+r+s=m\alpha+2\beta$ wherein m has a valency of M;

(2) an organoaluminum component obtained by reacting (i) one mole of a trialkylaluminum compound with (ii) 0.1 to 2 moles of a carbinol having 1 to 10 carbon atoms, 0.1 to 5 moles of a silanol or siloxane, or a mixture thereof;

(3) a component comprising said hydrocarbon-soluble organomagnesium component (1) and said organoaluminum component (2);

(4) a component comprising said hydrocarbon-soluble organomagnesium component (1) and an organoboron, organozinc, or organolithium compound; and (5) a component comprising said organoaluminum component (2) and an organoboron, organozinc, or organolithium compound.

The catalyst according to the present invention has the following remarkable, advantageous features:

(1) the molecular weight of the polymer can be controlled by slurry polymerization at a temperature of 100° C. or less, and the activity of the catalyst, in terms of the amount of polymers produced per 1 g of the catalyst, is high and the catalyst residue treatment step can be omitted;

(2) the melt flowability, especially the swelling ratio of the resultant polymer, is excellent; and (3) the particle size of the resultant polymer can be controlled and a polymer having a large particle size can be obtained.

The inorganic oxide carriers usable in the present invention include, for example, silica, silica-alumina, alumina, thoria, and zirconia. The preferred inorganic oxide carriers are silica and silica-alumina. Of the silica carriers, those having a specific surface area of 200 through 600 m²/g, determined by the BET method, a specific pore volume of 1 through 2 ml/g, and an average pore diameter of 50 through 300 Å are especially preferable in the practice of the present invention.

The water content of the carrier is desirably 0.01 through 1% by weight, more desirably 0.1 through 0.8% by weight. For this reason, the carrier is desirably dried prior to the supporting of the chromium compound. The carriers are desirably dried at a temperature of 100° C. or more, more desirably 200° through 1000° C., for several minutes through several tens of hours, more desirably 30 minutes through 20 hours, under a reduced pressure in an inert gas (such as oxygen, nitrogen, helium, or air) environment, containing no substantial amount of water. Drying is desirably carried out under a solid in a fluidized state in the presence of a sufficient amount of inert gas.

The chromium compounds usable in the present invention include, for example, chromium trioxide, chromic acid, silver chromate, potassium chromate, sodium chromate, magnesium chromate, and calcium chromate.

These chromium compounds are desirably used in the present invention after purification is carried out.

The amine compounds usable in the present invention include: for example, aliphatic amines such as ethylamine, propylamine, butylamine, amylamine, hexylamine, cyclohexylamine, octylamine, decylamine, methylethylamine, methylbutylamine, diethylamine, dipropylamine, dibutylamine, dihexylamine, dicyclohexylamine, dioctylamine, didecylamine, ethylpropylamine, ethylbutylamine, propylbutylamine, methyldiethylamine, methylethylbutylamine, methyldibutylamine, triethylamine, ethyldipropylamine, tripropylamine, tributylamine, triamylamine, trihexylamine, and triheptylamine; aromatic amines such as aniline, toluidine, xylidine, N-methylaniline, diphenylamine, and triphenyl amine; and heterocyclic amines such as pyrrole, pyridine, piperidine, and N-methyl pyrrolidine. Aliphatic amines are desirably used in the present invention.

The phosphoric amide compounds usable in the present invention include: for example, aliphatic phosphoric triamides such as hexamethylphosphoric triamide, hexaethylphosphoric triamide, hexapropylphosphoric triamide, hexabutylphosphoric triamide, hexahexylphosphoric triamide, and N,N-dimethyl-N',N',N'',N''-tetrabutylphosphoric triamide; aromatic phosphoric triamides such as N,N',N''-trihexylphosphoric triamide and N,N',N''-trinaphtylphosphoric triamide; and phosphoric diamides such as phosphoric acid dianilide. Aliphatic phosphoric triamides are desirably used in the present invention.

The reaction of a chromium compound such as chromium trioxide with amines or phosphoric amides can be desirably carried out in an inert hydrocarbon medium. Examples of such hydrocarbons are methylene chloride, chloroform, carbon tetrachloride, benzene, toluene, pentane, hexane, heptane, and cyclohexane. The reaction of a chromium compound such as chromium trioxide with amines or phosphoric amides is desirably carried out at a mol ratio of the chromium compound to the amines or the phosphoric amides of 1:0.1 through 1:10 at a temperature of 10° through 100° C., desirably 20° through 80° C., for several minutes through 20 hours, desirably 10 minutes through 5 hours. The use of too small an amount of the chromium compound results in only a small amount of the reaction product. Contrary to this, the use of too large an amount of the chromium compound results in an increase in the amount of the unreacted chromium compound.

The hydrocarbyloxy compounds of titanium, vanadium, hafnium and zirconium will now be explained.

The hydrocarbyloxy compounds of titanium usable in the present invention are those having the general formula:

$$Ti(OR^{16})_lX_{4-l}$$

wherein $R^{16}$ is a hydrocarbon group having 1 through 20 carbon atoms, X is a halogen atom, and l is a number of 1 through 4 (i.e. $1 \leq l \leq 4$). Examples of $R^{16}$ groups are methyl, ethyl, propyl, butyl, amyl, hexyl, heptyl, octyl, nonyl, decyl, dodecyl, phenyl, tolyl, and cyclohexyl. Desirably, l is $2 \leq l \leq 4$, and more desirably, l is $3 \leq l \leq 4$. In the case of $l < 4$, X is desirably chlorine.

The hydrocarbyloxy compounds of zirconium usable in the present invention are those having the general formula:

$$Zr(OR^{16})_lX_{4-l}$$

wherein $R^{16}$, X, and l are the same as defined above. Desirably, l is $2 \leq l \leq 4$, and more desirably, l is $3 \leq l \leq 4$. In the case of $l \leq 4$, X is desirably chlorine. Examples of the desirable compounds are $Zr(OC_3H_7)_4$, $Zr(OC_4H_9)_4$, $Zr(OC_5H_{11})_4$, $Zr(OC_6H_5)_4$, and $Zr(OC_4H_9)_3Cl$.

The hydrocarbyloxy compounds of hafnium usable in the present invention are those having the general formula:

$$Hf(OR^{16})_lX_{4-l}$$

wherein $R^{16}$, and X are the same as defined above, and l is a number of 1 through 3 (i.e. $1 \leq l \leq 3$).

The reaction of chromium compounds such as chromium trioxide with hydrocarbyloxy compounds of titanium, vanadium, zirconium, and hafnium can be carried out in the presence of an inert organic solvent. The presence of oxygen and water in the reaction medium is not desirable and, therefore, the contamination of the reaction medium with oxygen and water should be avoided. Furthermore, the exposure of the reaction medium to light also is not desirable. The unreacted chromium compounds are desirably removed from the reaction mixture. It appears that the reaction product contains compounds having the following structure:

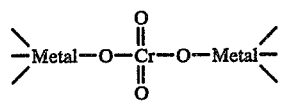

The germanium compounds having the general formula $R^1R^2R^3R^4Ge$ and usable in the present invention consist of two groups. In the case of the first group, $R^1$, $R^2$ and $R^3$ in the general formula are each independently a hydrocarbon group having 1 through 10 carbon atoms, and $R^4$ is a hydrogen atom, a halogen atom, —OH group, or —OGeR$^1$R$^2$R$^3$ group, and in the second group, $R^1$, $R^2$, $R^3$ and $R^4$ in the general formula are each independently —OR$^5$ wherein $R^5$ is a hydrocarbon group having 1 through 10 carbon atoms or a halogen atom, provided that $R^1$, $R^2$, $R^3$ and $R^4$ are not all halogen atoms.

In the first group of the germanium compounds, $R^1$, $R^2$ and $R^3$ in the general formula are independently a hydrocarbon group having 1 to 10 carbon atoms. Examples of such groups are: for example, aliphatic hydrocarbon groups such as methyl, ethyl, propyl, butyl, hexyl, octyl, and decylgroups; and aromatic hydrocarbon groups such as phenyl and tolyl groups. The aromatic hydrocarbon groups are desirably used in the present invention. $R^4$ in the general formula is a hydrogen atom, a halogen atom, —OH, or —OGeR$^1$R$^2$R$^3$. The halogen atom includes Cl, Br, or I, desirably Br. In the case of $R^4=$—OH, compounds having aliphatic hydrocarbon groups such as $R^1$, $R^2$ and $R^3$ are unstable and, therefore, compounds having aromatic hydrocarbon groups are desirable.

Examples of these compounds are trimethylgermane, trimethylchlorogermane, trimethylbromogermane, trimethyliodogermane, bis-trimethylgermoxane, triethylgermane, triethylchlorogermane, triethylbromogermane, triethyliodogermane, bis-triethylgermoxane, tripropylgerman, tripropylchlorogermane, tripropylbromogermane, tripropyliodogermane, bis-tripropylgermoxane, tributylgermane, tributylchlorogermane, tributylbromogermane, tributyliodogermane, bis-tributylgermoxane, trihexylgerman, trihexylchlorogermane, trihexyl-bronogerman, trihexyliodogermane, bis-trihexylgermoxane, trioctylgermane, trioctylchlorogermane, trioctylbromogermane, trioctyliodogermane, bis-trioctylgermoxane, tridecylgermane, tridecylchlorogermane, tridecylbromogermane, tridecyliodogermane, bis-tridecylgermoxane, triphenylgermane, triphenylchlorogermane, triphenylbromogermane, triphenyliodogermane, triphenylgermanol, bis-triphenylgermoxane, tritolylgermane, tritolylchlorogermane, tritolylbromogermane, tritolyliodogermane, tritolylgermanol, and bis-tritolylgermoxane.

In the second group of germanium compounds, $R^1$, $R^2$, $R^3$ and $R^4$ in the general formula are independently —$OR^5$ or a halogen atom wherein $R^5$ is a hydrocarbon group having 1 to 10 carbon atoms. Examples of $R^5$ are methyl, ethyl, propyl, butyl, amyl, hexyl, heptyl, octyl, nonyl, decyl, phenyl, tolyl, and cyclohexyl. The halogen atom is chlorine, bromine, or iodide, desirably chlorine. The number of the halogen atoms per germanium atom is 0 through 3, desirably 0 through 2 and more desirably 0 through 1. Accordingly, especially desirable compounds are represented by the general formulae: $(R^5O)_3GeCl$ and $(R^5O)_4Ge$.

The tin compounds usable in the present invention are those having the general formula $R^1R^2R^3R^6Sn$ wherein $R^1$, $R^2$ and $R^3$ are the same as defined above and $R^6$ is halogen atom or a —OH group. The halogen atom includes Cl, Br, or I, desirably Cl or Br. Examples of such tin compounds are trimethylchlorotin, trimethylbromotin, trimethyliodotin, trimethyltin hydroxide, triethylchlorotin, triethylbromotin, triethyliodotin, triethyltin hydroxide, tripropylchlorotin, tripropylbromotin, tripropyliodotin, tripropyltin hydroxide, tributylchlorotin, tributylbromotin, tributyliodotin, tributyltin hydroxide, trihexylchlorotin, trihexylbromotin, trihexyliodotin, trihexyltin hydroxide, trioctylchlorotin, trioctylbromotin, trioctyliodotin, trioctyltin hydroxide, tridecylchlorotin, tridecylbromotin, tridecyliodotin, tridecyltin hydroxide, triphenylchlorotin, triphenylbromotin, triphenyliodotin, triphenyltin hydroxide, tritolylchlorotin, tritolylbromotin, and tritolyltin hydroxide.

The reaction of the first group of germanium compounds with the chromium compounds, is, for example, those of (1) a trialkylbromogermane or triarylbromogermane with silver chromate, (2) a bis-trialkylgermoxane or bis-triarylgermoxane with chromic acid, (3) a triarylgermanol with chromium trioxide, and a trialkylgermane or triarylgermane with chromic acid. Examples of the reaction medium are methylene chloride, chloroform, carbon tetrachloride, benzene, toluene, pentane, hexane, heptane, and cyclohexane.

The reaction of the first group of germanium compounds with the chromium compounds is desirably carried out at a mol ratio of the germanium compounds to the chromium compounds of 1:0.1 through 1:10 at a temperature of 10° through 100° C., desirably 20° through 80° C., for several minutes through 20 hours, desirably 10 minutes through 5 hours. The use of too small an amount of the chromium compounds results in only a small amount of the reaction product. Contrary to this, the use of too large an amount of the chromium compounds results in an increase in the amount of the unreacted chromium compounds. The presence of a small amount of water in the reaction medium can desirably accelerate the reaction. It is estimated from the literature (e.g. Z. Chem. 20, 31, 1980) that the compounds obtained from the above-mentioned reaction are germanium chromates having the general formula:

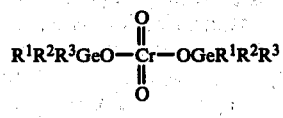

In the reaction of the second group of germanium compounds with the chromium compounds, chromium trioxide is most desirably used as a chromium compound. The reaction is desirably carried out in a reaction solvent such as, for example, methylene chloride, chloroform, carbon tetrachloride, benzene, toluene, pentane, hexane, heptane, and cyclohexane. The desirable mol ratio of the germanium compound to chromium trioxide in the reaction is 1:0.1 through 1:10. The use of a chromium compounds in an amount less than the above range results in only a small amount of the reaction product. Contrary to this, the use of a chromium compounds in an amount more than the above range results in an increase in the amount of the unreacted chromium compounds. The reaction is generally carried out at a temperature of 10° through 100° C., desirably 20° through 80° C., for a dozen or so minutes through 50 hours, desirably 30 minutes through 30 hours. It is estimated that the reaction product contains compounds having the following general formula:

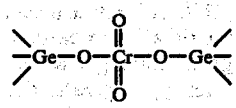

Examples of the reaction of tin compounds having the general formula $R^1R^2R^3R^4Sn$ with chromium compounds are (1) a trialkylhalogenotin or triarylhalogenotin with silver chromate and (2) a trialkyltin hydroxide or triaryltin hydroxide with chromium trioxide. The reaction solvents usable in the reaction of the germanium compounds with the chromium compounds can also be used in this reaction. The reaction mol ratio, the reaction temperature and the reaction time period in respect to this reaction are also substantially the same as in the case of the germanium compounds. It is also estimated from the known literature (e.g. Z. Chem. 20, 31, 1980) that the reaction product contains compounds having the general formula:

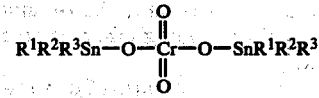

The above-mentioned reaction products can be supported on an inorganic oxide carrier such as silica in any conventional manner. For instance, the inorganic oxide carrier substance is impregnated with a solution of the above-mentioned reaction product, followed by either vaporization (or distillation) of the solvent or filtration of the solution. The former is preferred. Supporting is generally carried out at a temperature of −10° through 70° C., desirably 0° through 55° C. The chromium compounds are supported on the carrier in an amount of 0.01 through 10% by weight, desirably 0.05 through 5% by weight and more desirably 0.1 through 3% by weight.

The supported solid obtained above is calcined and activated. This activation is generally carried out in the presence of oxygen. It is especially important that the water content of the atmosphere be low when the supported solid is calcined. The water content of the atmosphere should be 20 ppm or less, desirably 10 ppm or less and more desirably 1 ppm or less. Calcination can be carried out under an inert gas atmosphere or under a reduced pressure. However, calcination is preferably carried out under an oxidizing atmosphere, such as air. Activation of the supported solid by calcination is carried out at a temperature of 300° through 900° C., desirably 500° through 800° C. The activation time is generally 0.5 through 10 hours; however, it depends upon the activation temperature.

The organometallic compound component (B) usable, together with the solid catalyst component (A), in the present invention will now be explained.

The organomagnesium compound component usable in the present invention includes hydrocarbon-soluble organomagnesium compounds having the general formula:

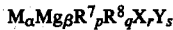
$$M_\alpha Mg_\beta R^7_p R^8_q X_r Y_s$$

wherein M is an element selected from aluminum, boron, beryllium, zinc or lithium; $R^7$ and $R^8$ are the same or different hydrocarbon groups having 1 to 20 carbon atoms; X and Y are the same or different groups selected from $OR^9$, $OSiR^{10}R^{11}R^{12}$, $NR^{13}R^{14}$, or $SR^{15}$ wherein $R^9$, $R^{10}$, $R^{11}$, $R^{12}$, $R^{13}$, and $R^{14}$ are each independently a hydrogen atom or a hydrocarbon group and $R^{15}$ is a hydrocarbon group having 1 to 20 carbon atoms; $\alpha$ is zero or greater than 0, $\beta$ is greater than zero, and p, q, r, and s are each zero or greater than zero, but p and q are not simultaneously zero, and $p+q+r+s=m\alpha+2\beta$ wherein m has a valency of M.

In the above-mentioned general formula, examples of the hydrocarbon groups represented by $R^7$ through $R^{15}$ are alkyl groups, desirably having 1 to 20 carbon atoms, cycloalkyl groups, desirably having 3 to 10 carbon atoms, or aryl groups, desirably having 6 to 20 carbon atoms. Typical examples of such groups are methyl, ethyl, propyl, butyl, amyl, hexyl, decyl, cyclohexyl, and phenyl groups. Especially, $R^7$ is desirably an alkyl group, $R^9$ through $R^{14}$ may be a hydrogen atom, and $R^9$ is desirably a hydrogen atom.

In the case of $\alpha>0$, aluminum, boron, zinc, beryllium and lithium are desirably used as the metal M since these metals readily form hydrocarbon-soluble organomagnesium complexes. The ratio of magnesium to the metallic atom M (i.e. $\beta/\alpha$) is desirably 0.2 or more and more desirably 0.5 or more although there is no critical limitation of this ratio.

The relationship $p+q+r+s=m\alpha+2\beta$ shows the stoichiometry of the organomagnesium compound component. The relationship $(r+s)/(\alpha+\beta)$, which means a ratio of the total number of X and Y to the total number of metallic atoms, is generally $0 \leq (r+s)/(\alpha+\beta) \leq 1.5$, desirably $0 \leq (r+s)/(\alpha+\beta) \leq 1.0$ and more desirably $0 \leq (r+s)/(\alpha+\beta) \leq 0.8$.

The above-mentioned organomagnesium complex compounds usable in the present invention are synthesized by reacting an organomagnesium compound represented by the general formula $R^7MgX$ or $R^7_2Mg$, wherein $R^7$ is the same as defined above and X is a halogen, with an organometallic compound represented by $MR^8_m$ or $MR^8_{m-1}H$, wherein M, $R^8$ and m are the same as defined above, at a temperature ranging from room temperature to 150° C. in an inert hydrocarbon solvent, such as hexane, heptane, cyclohexane, benzene, and toluene. Furthermore, the above-mentioned organomagnesium compounds can also be synthesized by the reaction of (i) $MgX_2$ and $MR^8_m$ or $MR^8_{m-1}H$ or (ii) $R^7MgX$ or $MgR^7_2$ and $R^8_nMX_{m-n}$ wherein M, $R^7$ and $R^8$ are the same as defined above and n is a number of 0 through m.

In the case of $\alpha=0$ and $\gamma=0$ in the above-mentioned general formula of the organomagnesium compounds, that is, the hydrocarbon-soluble organomagnesium compounds having the general formula $MgR^7_p R^8_q$, the following three groups are generally involved.

(a) At least one of $R^7$ and $R^8$ is a secondary or tertially alkyl group having 4 to 6 carbon atoms;

(b) $R^7$ and $R^8$ are alkyl groups having different carbon atoms; and (c) At least one of $R^7$ and $R^8$ is a hydrocarbon group having 6 or more carbon atoms.

Of these three groups, the corresponding following three groups are desirable for use in the present invention:

(a') Both $R^7$ and $R^8$ are alkyl groups having 4 to 6 carbon atoms and at least one of $R^7$ and $R^8$ is a secondary or tertially alkyl group.

(b') $R^7$ is an alkyl group having 2 or 3 carbon atoms and $R^8$ is an alkyl group having 4 or more carbon atoms.

(c') Both $R^7$ and $R^8$ are alkyl groups having 6 or more carbon atoms.

Examples of these groups are as follows. The secondary alkyl groups or the tertially alkyl groups having 4 to 6 carbon atoms in the above-mentioned cases (a) and (a') include, for example, sec-$C_4H_9$, tert-$C_4H_9$, —$CH(C_2H_5)_2$, —$C(C_2H_5)(CH_3)_2$, —$CH(CH_3)(C_4H_9)$, —$CH(C_2H_5)(C_3H_7)$, —$(CH_3)_2(C_3H_7)$, and —$C(CH_3)(C_2H_5)_2$. The desirable group is a secondary alkyl group, especially the sec—$C_4H_9$ group.

The alkyl groups having 2 or 3 carbon atoms in the above-mentioned cases (b) and (b') include, for example, ethyl and propyl groups, desirably the ethyl group. The alkyl groups having 4 or more carbon atoms include, for example, butyl, amyl, hexyl and octyl groups, desirably the butyl and hexyl groups.

The hydrocarbon groups having 6 or more carbon atoms in the above-mentioned cases (c) and (c') include, for example, an alkyl group, such as hexyl, octyl, or decyl group, and a phenyl group, desirably a hexyl group.

Examples of the above-mentioned organomagnesium compounds are (sec—$C_4H_9$)$_2$Mg, (tert—$C_4H_9$)$_2$Mg, n—$C_4H_9$—Mg—$C_2H_5$, n—$C_4H_9$—Mg—sec—$C_4H_9$, n—$C_4H_9$—Mg—tert—$C_4H_9$, n—$C_6H_{13}$—Mg—$C_2H_5$, (n—$C_6H_{13}$)$_2$Mg, (n—$C_8H_{17}$)$_2$Mg, and (n—$C_{10}H_{21}$)$_2$Mg.

Examples of X in the above-mentioned general formula are desirably $OR^9$ and $OSiR^{10}R^{11}R^{12}$ and most desirably $OSiR^{10}R^{11}R^{12}$. The ratio of $OR^9$ or $OSiR^{10}R^{11}R^{12}$ to the metallic magnesium atom (i.e. r) is desirably 0.1 through 2 and more desirably 0.2 through 1.5.

The organoaluminum compound conponents usable in the present invention include, for example, components obtained by reacting and/or mixing trialkylaluminum compounds with carbinols and/or silanols or hydrosiloxy compounds.

Examples of the trialkylaluminum compounds are trimethylaluminum, triethylaluminum, tri-n-propylaluminum, tri-iso-propylaluminum, tri-n-butylaluminum, tri-iso-butylaluminum, triamylaluminum, trihexylaluminum, trioctylaluminum, tridecylaluminum, tridodecylaluminum and isoprenylaluminum. These compounds can be used alone or in mixtures thereof.

The carbinols having 1 to 10 carbon atoms include, for example, methyl alcohol, ethyl alcohol, n-and iso-propyl alcohol, n-, iso-and tert-butyl alcohol, n-, iso-, sec-and tert-amyl alcohol, phenol, and cresol.

The reaction ratio of the carbinol to the trialkylaluminum is 0.1 through 2 moles, desirably 0.15 through 1.5 moles and most desirably 0.2 through 1.3 moles, based on 1 mol of trialkylaluminum.

Examples of the silanols usable in the present invention are trimethylsilanol, triethylsilanol, tripropylsilanol, tributylsilanol, and triphenylsilanol. Hydrozates of, for example chlorosilanes and polysilanols can also be used in the present invention.

Examples of the hydrosiloxy compounds usable in the present invention are as follows:

methylhydropolysiloxane:

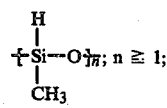

ethylhydropolysiloxane:

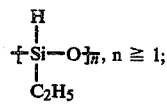

propylhydrosiloxane:

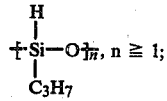

butylhydrosiloxane:

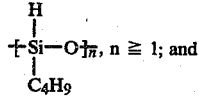

phenylhydroxiloxane:

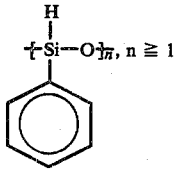

The reaction ratio of the silanols or hydrosiloxy compounds to the trialkylaluminum is 0.1 through 5 moles, desirably 0.1 through 2 moles and most desirably 0.2 through 1.5 moles, based on 1 mol of the trialkylaluminum.

The ratio of the organoaluminum component to the organomagnesium component is 0.05 through 50 moles, desirably 0.1 through 10 moles, based on 1 mol of the organomagnesium component.

The organomagnesium component and the organoaluminum component can be added to a polymerization mixture separately or in the form of a mixture obtained from previous mixing of the organomagnesium component and the organoaluminum component. Previous contact between the solid catalyst component and a small amount of the component (B) prior to its addition to the polymerization mixture provides a good result.

The ratio of the component (B) to the component (A) in terms of the metals (gr. atom) in the component (B)/CR (gr. atom) in the component (A) is generally 0.01 through 3000, desirably 0.1 through 100.

The catalyst according to the present invention is suitably used in the polymerization of ethylene or in the copolymerization of ethylene in which ethylene is a main constituent. Monomers usable in the copolymerization of ethylene are mono-olefins or diolefins having 3 to 12 carbon atoms. Examples of such monomers are propylene, butene-1, pentene-1, 3-methylbutene-1, hexene-1, 4-methylpentene-1, 3-ethylbutene-1, heptene-1, octene-1, decene-1, butadiene, isoprene, 1,4-hexadiene, 1,5-hexadiene, 1,7-octadiene, dicyclopentadiene, and ethylidene norbornene. One or two of these monomers can be used in the copolymerization of ethylene.

The density of the ethylene polymers or ethylene copolymers produced by using the present catalyst is approximately 0.91 through 0.97.

Polymerization can be carried out in any conventional manner, including suspension polymerization, bulk polymerization, solution polymerization, and gas phase polymerization.

The polymerization reaction can be generally carried out at a temperature ranging, for example, from room temperature to approximately 300° C. However, the polymerization conditions depend upon the polymerization pressure, the partial pressure of the moomer, and the kinds and concentrations of the catalyst components. Generally speaking, polymerization is carried out in a slurry state at a temperature ranging from room temperature through 100° C. and in a solution state at a temperature of 100° through 200° C. Polymerization is desirably carried out in a slurry state. Furthermore, polymerization may be carried out under a gas phase condition substantially in the absence of an inert organic solvent.

When the polymerization reaction is carried out in the presence of an inert organic solvent, hydrocarbon solvents are desirably used. Examples of such organic hydrocarbon solvents are: aliphatic saturated hydrocabons, such as butane, isobutane, pentane, hexane, heptane, octane, isooctane, decane, and purified kerosene; alicyclic saturated hydrocarbons, such as cyclopentane, cyclohexane, dimethylcyclopentane, and methylcyclohexane; and aromatic hydrocarbons, such as benzene, toluene, and xylene. Desirable hydrocarbon solvents are isobutane, pentane, hexane, heptane, and cyclohexane.

Polymerization may be carried out in the presence of a molecular weight modifier, such as hydrogen, and halogenated hydrocarbons, desirably hydrogen. The amount of the molecular weight modifier can be optionally controlled as required.

Polymerization can be carried out by means of a conventional one-stage polymerization method using one reaction zone or by means of a so-called multi-stage polymerization method using a plurality of reaction zones. The polymers obtained by using the present catalyst have a wide molecular weight distribution and a relatively high molecular weight, even when obtained by using a one-stage polymerization method, and, therefore, are especially suitable for use in blow molding and film molding. Polymers having an additionally wide molecular weight distribution can be produced by means of multi-stage polymerization in which two or more polymerization conditions are used.

The present invention will now be specifically illustrated by, but is by no means limited to, the Examples set forth below.

The term "catalyst efficiency" used in the Examples is defined by the amount of polymers produced in one hour based on 1 g of the solid catalyst. The physical properties in the Examples were determined as follows:

Melt index (MI): determined by ASTM-D-1238 (at 190° C., under a 2.16-kg load) (i)

$$\text{Flow rate } (FR)^* = \frac{MI \text{ (at 190° C., under a 21.6-kg load)}}{MI \text{ (at 190° C., under a 21.6-kg load)}}$$ (ii)

Swelling ratio (SR)** = weight (g) of a 10-cm-long molten polymer strand discharged from a melt indexer at 190° C. under a 21.6-kg load. (iii)

*molecular weight distribution
**relative swelling ratio

EXAMPLE 1

(1) Reaction of a titanium hydrocarbyloxy compound and chromium trioxide

Fifteen ml of titanium tetra n-butoxide, 120 ml of carbon tetrachloride and 2 g of anhydrous chromium trioxide were charged into a flask. The mixture was heated to a refluxing temperature of the solvent under stirring in a nitrogen atmosphere and allowed to react under reflux for 24 hours. Thus, a green reaction mixture was obtained. After removing solid matters from the reaction mixture by filtration, a reaction product solution was recovered.

(2) Preparation of a solid catalyst

One hundred grams of a commercially available silica (Davison 952 ® manufactured by W. R. Grace & Co., Davison Chemical Division) was added to the above-prepared solution of the titanium reaction product (corresponding to 1 g of chromium metal atom), together with 1 liter of n-hexane. The mixture was allowed to react at a temperature of 60° C. for 4 hours under stirring. The solvent was distilled off and the resultant product was dried for further 2 hours under a reduced pressure. The resultant solid was calcined in a dried air at a temperature of 800° C. for 4 hours. This, a solid catalyst component was obtained.

(3) Synthesis of a hydrocarbon-soluble organomagnesium component 13.8 g of di-n-butylmagnesium and 1.9 g of triethylaluminum were charged, together with 100 ml of n-heptane, into a flask purged with nitrogen and reacted at a temperature of 80° C. for 2 hours. Thus, an organomagnesium complex solution was obtained. As result of analysis, the composition of the complex was AlMg$_{6.0}$(C$_2$H$_5$)$_{3.0}$(n-C$_4$H$_9$)$_{11.9}$ and the concentration of the organometal was 1.18 mol/l.

(4) Synthesis of an organoaluminum compound 22.8 g of triethylaluminum, 430 ml of n-pentane and 12 g of hydromethylsiloxane tetramer were charged into a pressure resistant vessel and reacted at a temperature of 120° C. for 5 hours. The reaction product thus obtained was weighed out and the concentration of aluminum and the concentration of ethane after decomposition were determined. The composition of the reaction product was Al(C$_2$H$_5$)$_2$(OSiH.CH$_3$.C$_2$H$_5$).

(5) Polymerization of ethylene

Fifty mg of the solid catalyst component obtained in (2) above, 0.05 m mol of the organomagnesium component obtained in (3) above and 0.15 m mol of the organoaluminum obtained in (4) above were charged, together with 1.6 liter of hexane, into an autoclave, which had been dried in vacuo and purged with nitrogen. Ethylene was added in an amount corresponding to a pressure of 10 kg/cm$^2$ and hydrogen was added in such an amount that the total pressure becomes 14 kg/cm$^2$, while the inside temperature of the autoclave was maintained at 80° C. The polymerization was carried out for 2 hours, while the total inside pressure of the autoclave was maintained at 14 kg/cm$^2$ by supplying ethylene. Thus, 270 g of polyethylene was obtained.

The catalyst efficiency was 2700 g-polyethylene (PE)/ g-solid catalyst hr, MI of the polymer was 0.1 g/10 min and FR was 255.

The swelling ratio, which represents one characteristics of melt flowability, was determined. As a result, the swelling ratio of the resultant polymer was 0.81, which was remarkably smaller than that (i.e. 1.05) of a polymer obtained from a Phillips catalyst in which no titanium compound was contained in the above-prepared catalyst.

EXAMPLE 2

Example 1 was repeated, except that an organoaluminum compound obtained in the following manner was used in lieu of the organoaluminum compound synthesized in Example 1.

One hundred and twenty five m moles of triethylaluminum, 200 ml of n-pentane and 125 m moles, in terms of Si, of methylhydropolysiloxane having a viscosity of 50 centistokes were allowed to react at a temperature of 80° C. for 2 hours. As a result of analysis, it was confirmed that the composition of the reaction product was Al(C$_2$H$_5$)$_2$(OSiHCH$_3$C$_2$H$_5$).

The results of the polymerization were as follows.
Yield of polyethylene: 254 g
Catalyst efficiency: 2540 g-PE/g-solid catalyst.hr
MI: 0.09 g/10 min
FR: 220

EXAMPLE 3

One hundred grams of a commercially available silica (i.e. Davison 952 ®) was mixed with the solution of the titanium reaction product obtained in step (1) of Example 1 (in an amount corresponding to 1 g of chromium metal atom) and 500 ml of n-hexane and the mixture was allowed to react at a temperature of 60° C. for 4 hours under stirring. The solid matters were filtered out and dried in a dried air stream. The dried solid was calcined at a temperature of 800° C. for 4 hours in a dried air. Thus, a solid catalyst component was obtained.

Ethylene was polymerized in the same manner as in Example 1, except that the above-prepared solid catalyst component was used.

and an organoaluminum compound were changed as shown in Table 1.

The results are shown in Table 1.

TABLE 1

| Example No. | Organomagnesium component | | Organoaluminum compound | | Catalyst efficiency | |
|---|---|---|---|---|---|---|
| | Composition | Amount used m mol | Composition | Amount used m mol | g-PE/ g-solid cat · hr | MI g/ 10-min |
| 5 | AlMg(n-$C_4H_9$)$_2$($C_2H_5$)$_3$ | 0.1 | Al($C_2H_5$)$_2$(OSiH$CH_3C_2H_5$) | 0.10 | 3000 | 0.04 |
| 6 | AlMg$_{3.0}$(n-$C_4H_9$)$_{4.0}$($C_2H_5$)$_{2.0}$(OSiH$CH_3C_4H_9$)$_{3.0}$ | 0.1 | Al($C_2H_3$)$_2$(OSiH$CH_3C_2H_5$) | 0.15 | 2760 | 0.11 |
| 7 | BMg($C_2H_5$)$_{2.8}$(n-$C_4H_9$)$_{2.2}$ | " | " | 0.20 | 2510 | 0.14 |
| 8 | BeMg$_{4.0}$($C_2H_5$)$_{3.1}$(n-$C_4H_9$)$_{6.8}$ | " | " | " | 2220 | 0.13 |
| 9 | ZnMg$_{2.0}$($C_2H_5$)$_{2.1}$(n-$C_4H_9$)$_{3.9}$ | " | Al(i-$C_4H_9$)$_{2.5}$(OSiH$CH_3C_4H_9$)$_{0.5}$ | 0.15 | 2800 | 0.12 |
| 10 | Li$_2$Mg(i-$C_3H_7$)$_2$(n-$C_4H_9$)$_2$ | " | Al($C_3H_7$)$_2$(OSiH$CH_3C_3H_7$) | " | 2580 | 0.14 |
| 11 | AlMg$_{3.0}$(n$C_4H_9$)$_{4.5}$($C_2H_5$)(OSiH$CH_3C_2H_5$)$_{1.5}$ | 0.2 | — | — | 2740 | 0.41 |
| 12 | Mg(sec-$C_4H_9$)$_{0.8}$(n-$C_4H_9$)$_{0.8}$(OSiH$CH_3C_4H_9$)$_{0.4}$ | 0.1 | Al($C_2H_3$)$_{2.0}$(O$C_2H_5$) | 0.15 | 2920 | 0.68 |
| 13 | (sec-$C_4H_9$)$_{1.5}$Mg(On-$C_4H_9$)$_{0.5}$ | 0.05 | Al($C_2H_5$)$_2$(OSiH$CH_3C_2H_5$) | " | 2440 | 0.21 |
| 14 | (sec-$C_4H_9$)$_{0.8}$Mg(n-$C_4H_9$)$_{0.8}$(On-$C_4H_9$)$_{0.4}$ | " | Al($C_2H_5$)$_{1.5}$(OSiH$CH_3C_2H_5$)$_{1.5}$ | " | 2300 | 0.24 |

The results of the polymerization were as follows.
Yield of polyethylene: 240 g
Catalyst efficiency: 2400 g-PE/g-solid catalyst.hr
MI: 0.46 g/10 min
FR: 147

EXAMPLE 15–21

Ethylene was polymerized in the same manner as in Example 1 except that the compounds listed in Table 2 below were used. The results are also shown in Table 2.

TABLE 2

| Example No. | Titanium compound | Supported Cr amount (% by weight in terms of Cr) | Calcining conditions | | Catalyst efficiency g-PE/g-solid cat · hr | MI (g/10-min) | FR |
|---|---|---|---|---|---|---|---|
| | | | Temperature | Time | | | |
| 15 | Ti(Oi-Pr)$_4$ | 1 | 700 | 4 | 2580 | 0.1 | 220 |
| 16 |  | 0.5 | 600 | 4 | 2000 | 0.04 | 265 |
| 17 | Ti(Oi-Bu)$_4$ | 1 | 800 | 3 | 2660 | 0.1 | 215 |
| 18 | Ti(O2EthylHexyl)$_4$ | 0.5 | 750 | 3 | 1940 | 0.06 | 273 |
| 19 | Zr(On-Bu)$_4$ | 0.7 | 700 | 4 | 2260 | 0.12 | 244 |
| 20 | VO(On-Bu)$_3$ | 0.6 | 580 | 4 | 1740 | 0.11 | 255 |
| 21 | Hf(OBu)$_4$ | 0.8 | 630 | 4 | 1650 | 0.08 | 241 |

EXAMPLE 4

To 100 mg of the solid catalyst component obtained in Example 1, 0.01 m mol of an orgianomagnesium component Mg$_{6.0}$(n-$C_4H_9$)$_{12}$($C_2H_5$)$_{3.0}$ (a 1 mol/l solution in hexane) and 0.01 m mol of an organoaluminium compound Al($C_2H_5$)$_2$(OSiH.$CH_3$.$C_2H_5$) (a 1 mol/l solution in hexane) was added and the mixture was al-

EXAMPLES 22–25

Ethylene was polymerized in the same manner as in Example 1 except that the components (B) listed in Table 3 were used. The solid catalyst component was prepared in the same manner as in Example 1.

The results are shown in Table 3.

TABLE 3

| Example No. | Component B | | | | Catalyst efficiency g-PE/g-solid · hr | MI 9/10-min | FR |
|---|---|---|---|---|---|---|---|
| | Organomagnesium component | Amount used m mol | Second component | Amount used m mol | | | |
| 22 | AlMg(n-$C_4H_9$)$_2$($C_2H_5$)$_3$ | 0.05 | B($C_2H_5$)$_3$ | 0.15 | 3200 | 0.05 | 180 |
| 23 | " | " | Al($C_2H_5$)$_{2.25}$($C_2H_5$)$_{0.5}$(OSiH$CH_3C_2H_5$)$_{0.25}$ | 0.15 | 3060 | 0.15 | 195 |
| 24 | AlMg(n-$C_4H_9$)$_2$($C_2H_5$)$_3$ | 0.10 | Zn($C_2H_5$)$_2$ | 0.10 | 2880 | 0.21 | 200 |
| 25 | AlMg$_{3.0}$(n-$C_4H_9$)$_6$($C_2H_5$)$_3$ | 0.10 | (n-$C_4H_9$)Li | 0.10 | 2900 | 0.14 | 210 | lowed to react at a room temperature for 1 day. The polymerization of ethylene in Example 1 was repeated except that the catalyst prepared above was used in lieu of the catalyst of Example 1.

The results of the polymerization were as follows.
Yield of polyethylene: 308 g
Catalyst efficiency: 3080 g-PE/g-solid catalyst.hr
MI: 0.06 g/10 min
FR:290

EXAMPLES 5–14

Ethylene was polymerized in the same manner as in Example 1 except that an organomagnesium component

EXAMPLE 26

(1) Reaction of a germanium compound and chromic acid

Thirty ml of $CH_2Cl_2$, 5 m mol of hexaphenyldigermoxane, 5 m mol of chromium trioxide, and 5 m mol of $H_2O$ were charged into a 100 ml flask purged with nitrogen. The mixture was stirred at a room temperature for 2 hours. Thus, a blown solution was obtained after removing a water layer. The solution thus obtained was dehydrated with $MgSO_4$ and filtered. The chromium content of the solution was 3.4 mg-Cr atom/ml.

(2) Supporting and calcination of the chromium compound

Silica (Davison 952 ®) was dried at a temperature of 800° C. for 4 hours in a dry nitrogen stream. 5 g of the dried silica was charged, together with 20 ml of $CH_2Cl_2$, into a 100 ml flask purged with nitrogen. 14.6 ml of the solution obtained in (1) above was dropwise added to the flask at a room temperature under stirring. After stirring for 30 minutes, $CH_2Cl_2$ was distilled off under a reduced pressure. The resultant solid was calcined at a temperature of 800° C. for 4 hours in a dry air fluidized state. Thus, the solid catalyst component was obtained.

(3) Synthesis of a hydrocarbon-soluble organomagnesium component 13.6 g of di-n-butylmagnesium and 1.83 g of triethylaluminum were charged, together with 100 ml of n-heptane, into a flask purged with nitrogen and reacted at a temperature of 80° C. for 2 hours. Thus, an organomagnesium complex solution was obtained. As a result of analysis, the composition of the complex was $AlMg_{6.0}(C_2H_5)_{3.0}(n-C_4H_9)11.9$ and the concentration of the organometal was 1.18 mol/l.

(4) Synthesis of an organoaluminum component 22.9 g of triethylaluminum, 430 ml of n-pentane and 12.05 g of hydromethylsiloxane tetramer were charged into a pressure resistant vessel and reacted at a temperature of 120° C. for 5 hours. The reaction product thus obtained was weighed out and the concentration of aluminum and the concentration of ethane after decomposition were determined. The composition of the reaction product was $Al(C_2H_5)_2(OSiH.CH_3.C_2H_5)$.

(5) Polymerization of ethylene

Fifty mg of the solid catalyst component obtained in (2) above, 0.05 m mol of the organomagnesium component obtained in (3) above and 0.15 m mol of the organoaluminum obtained in (4) above (Mg+Al=0.20 m mol) were charged, together with 0.8 liter of hexane, into an autoclave, which had been dried in vacuo and purged with nitrogen. Ethylene was added in an amount corresponding to a pressure of 10 kg/cm² and hydrogen was added in such an amount that the total pressure becomes 14 kg/cm², while the inside temperature of the autoclave was maintained at 80° C. The polymerization was carried out for 2 hours, while the total inside pressure of the autoclave was maintained at 14 kg/cm² by supplying ethylene. Thus, 280 g of polymer was obtained.

The catalyst activity was 560,000 g/g. Cr atom, MI 0.34 g/10 min., FR 90 and the bulk density 0.42 g/c.c.

EXAMPLES 27-31

Ethylene was polymerized in the same manner as in Example 26 except that the organomagnesium components and the organoaluminum components listed in Table 4 below were used. The results are shown in Table 4.

EXAMPLE 32

Thirty ml of $CH_2Cl_2$, 5 m moles of trigermane, 5 m moles of chromium trioxide and 5 m moles of $H_2O$ were charged into a 100 ml flask purged with nitrogen. The mixture was stirred at a room temperature for 2 hours. Thus, a blown solution was obtained after removing a water layer. The solution thus obtained was dehydrated with $MgSO_4$ and filtered. The chromium content of the solution was 3.7 mg Cr—atom/ml. The solution was supported on the carrier and calcined in the same manner as in Example 27.

Thus, the solid catalyst component was obtained.

Ethylene was polymerized in the same manner as in Example 26 except that the above-prepared solid catalyst was used. The results are shown in Table 4 below.

EXAMPLE 33

Thirty ml of $CH_2Cl_2$, 5 m mol of triphenyltin hydroxide, and 5 m moles of $H_2O$ were charged into a 100 ml flask purged with nitrogen. The mixture was stirred at a room temperature for 3 hours. A blown solution was obtained after filtration. The chromium content of the solution was 4.2 mg Cr atom/ml. The solution was supported on the carrier and calcined in the same manner as in Example 26. Thus, the solid catalyst component was obtained.

Ethylene was polymerized in the same manner as in Example 26 except that the above-prepared solid catalyst was used. The results are shown in Table 4.

EXAMPLE 34

Thirty ml of carbon tetrachloride, 5 m moles of tetra-n-butoxygermanium, and 5 m moles of chromium trioxide were charged into a 100 ml flask purged with nitrogen and allowed to react for 15 hours under reflux. After filtration, a black-greenish brown solution was obtained. The chromium content of the solution was 0.32 mg Cr atom/ml. The solution was supported on the carrier and calcined in the same manner as in Example 26.

Ethylene was polymerized in the same manner as in Example 26 except that the above-prepared solid catalyst was used. The results are shown in Table 4.

EXAMPLE 35

Ethylene was polymerized in the same manner as in Example 26 except that the solid catalyst component of Example 34 as well as the organomagnesium component and the organoaluminum component listed in Table 4 were used. The results are shown in Table 4.

TABLE 4

| Example No. | Starting materils for solid catalyst component | | | Organoaluminum component | Amount used (m mol) | Organomagnesium component | Amount used (m mol) | Catalyst activity (g/g · Cr) [Catalyst efficiency g-PE/g-solid cat · hr] | MI (g/10-min) | FR |
|---|---|---|---|---|---|---|---|---|---|---|
| | Ge or Sn compound | Cr compound | Other | | | | | | | |
| 26 | $(\phi_3Ge)_2O$ | $CrO_3$ | $H_2O$ | $AlEt_{2.0}(OSiHMeEt)$ | 0.15 | $AlMg_{6.0}Et_{3.0}nBu_{11.9}$ | 0.05 | 560,000 [2800] | 0.34 | 90 |
| 27 | " | " | " | — | — | $AlMgnBu_{2.0}Et_{3.0}$ | 0.20 | 604,000 | 0.07 | 130 |

TABLE 4-continued

| Example No. | Starting materils for solid catalyst component Cr | | | Organoaluminum component | Amount used (m mol) | Organomagnesium component | Amount used (m mol) | Catalyst activity (g/g · Cr) [Catalyst efficiency g-PE/g-solid cat · hr] | MI (g/10-min) | FR |
| --- | --- | --- | --- | --- | --- | --- | --- | --- | --- | --- |
| | Ge or Sn compound | compound | Other | | | | | | | |
| 28 | " | " | " | AlEt$_{2.0}$(OSiHMeEt) | 0.20 | BMgEt$_{2.8}$nBu$_{2.2}$ | 0.10 | 440,000 [3020] [2200] | 0.21 | 110 |
| 29 | " | " | " | " | " | BeMgEt$_{2.1}$nBu$_{2.9}$ | " | 470,000 [2350] | 0.18 | 105 |
| 30 | " | " | " | " | " | ZnMg$_{2.0}$Et$_{2.1}$nBu$_{3.9}$ | " | 492,000 [2460] | 0.19 | 110 |
| 31 | " | " | " | AliPr$_2$(OSiHMeiPr) | " | Li$_2$MgiPr$_2$nBu$_2$ | " | 476,000 [2380] | 0.20 | 103 |
| 32 | Me$_3$GeH | CrO$_3$ | H$_2$O | AlEt$_{2.0}$(OSiHMeEt) | 0.15 | AlMg$_{6.0}$Et$_{3.0}$nBu$_{11.9}$ | 0.05 | 530,000 [2650] | 0.18 | 120 |
| 33 | φ$_3$SnOH | CrO$_3$ | — | " | " | " | " | 580,000 [2900] | 0.66 | 80 |
| 34 | (nBuO)$_4$Ge | CrO$_3$ | — | " | " | " | " | 410,000 [2100] | 0.21 | 115 |
| 35 | " | " | H$_2$O | AlEt$_{2.0}$(OSiHMeEt) | " | AlMg$_{6.0}$Et$_{1.5}$nBu$_{12.0}$(OSiHMeEt)$_{1.5}$ | " | 470,000 [2350] | 0.20 | 117 |

EXAMPLE 36

(1) Reaction of amine with chromium trioxide

Twenty ml of CH$_2$Cl$_2$, and 0.5 g (5 m moles) of chromium trioxide were charged into a 100 ml flask purged with nitrogen and 1.2 ml (5 m moles) of (n—C$_4$H$_9$)$_3$N was dropwise added to the mixture at a room temperature under stirring. The mixture was stirred for further 2 hours and, after removing the unreacted solid by filtration, a blackish blown solution was obtained. The chromium content in the solution was 3.6 mg Cr atom/ml.

(2) Supporting of a chromium compound

Five grams of silica (Davison 952®), which was previously dried at a temperature of 800° C. for 4 hours in a dry nitrogen stream, was charged into a 100 ml flask purged with nitrogen and, then, 20 ml of CH$_2$Cl$_2$ was added thereto. 4.1 ml of the solution prepared in (1) above was dropwise added to the mixture at a room temperature under stirring. After stirring for further 30 minutes, CH$_2$Cl$_2$ was distilled off under a reduced pressure. Thus, pale blown solid was obtained.

(3) Calcination of solid

The solid obtained in (2) above was calcined at a temperature of 800° C. for 4 hours in a dry air fluidized state. Thus, a solid catalyst component was obtained.

(4) Synthesis of a hydrocarbon-soluble organomagnesium component 13.8 g of di-n-butylmagnesium and 6.81 g of Al(C$_2$H$_5$)$_{1.50}$(OSi.H.CH$_3$.C$_2$H$_5$)$_{1.50}$ were charged, together with 100 ml of n-heptane, into a 500 ml flask purged with nitrogen and reacted at a temperature of 80° C. for 2 hours. Thus, a siloxy-containing organomagnesium complex having a composition of AlMg$_{3.0}$(C$_2$H$_5$)$_{1.50}$(n-C$_4$H$_9$)$_{6.0}$(OSi.H.CH$_3$.C$_2$H$_5$)$_{1.50}$ was obtained.

(5) Polymerization of ethylene

Forty mg of the solid catalyst component obtained in (3) above, and 0.20 m mol [Mg+Al=0.20 m mol] of the siloxy-containing organomagnesium component obtained in (4) above were charged, together with 0.8 l of dehydrated and deaerated hexane, into a 1.5 liter autoclave, which has been evacuated in vacuo and purged with nitrogen. Ethylene was added in an amount corresponding to a pressure of 10 kg/cm$^2$ and hydrogen was added in such an amount that the total pressures becomes 14 kg/cm$^2$, while the inside temperature of the autoclave was maintained at 80° C. The polymerization was carried out for 2 hours, while the total inside pressure of the autoclave was maintained at 14 kg/cm$^2$ by supplying ethylene. Thus, 176 g of polymer was obtained.

The catalyst activity was 629,000 g/g.Cr atom, MI 0.23 g/10 min and FR 140. The particle size distribution of the polymer was such that 20 mesh up was 21%, 28 mesh up 39%, and 35 mesh up 21%. Thus, the resultant polymer had a large particle size, more than 80% of which particles was a size not passing through a 35 mesh sieve.

EXAMPLES 37–40

Ethylene was polymerized in the same manner as in Example 36 except that the compounds listed in Table 5 was used in lieu of the amine compound of Example 36 and the amount of the chromium supported was changed. The results are shown in Table 5 below.

EXAMPLES 41 AND 42

Ethylene was polymerized in the same manner as in Example 37 except that the amount and the composition of the organomagnesium component were changed. The results are shown in Table 5.

EXAMPLE 43

13.80 g of di-n-butylmagnesium and 1.10 g of triethylaluminum were charged, together with 200 ml of n-heptane, into a 500 ml flask and allowed to react at a temperature of 80° C. for 2 hours under stirring. Thus, an organomagnesium component having a composition of AlMg$_6$(C$_2$H$_5$)$_3$(n—C$_4$H$_9$)$_{12}$ was prepared.

Ethylene was polymerized in the same manner as in Example 36 except that the organomagnesium component obtained above was used. The results are shown in Table 5.

EXAMPLE 44

13.80 g of di-n-butylmagnesium and 2.85 g of triethylaluminum were charged, together with 200 ml of n-heptane, into a 500 ml flask and allowed to react at a temperature of 80° C. for 2 hours under stirring. Thus, an organomagnesium having a composition of $AlMg_4(C_2H_5)_3(n-C_4H_9)_8$ was obtained. The solution thus obtained was cooled to a temperature of 10° C. and 50 ml of a n-heptane solution containing 50 m mol of n-butanol was dropwise added to the solution over 1 hour, while the reaction mixture was cooled. Thus, an alkoxy-containing organomagnesium component having a composition of $AlMg_{4.0}(C_2H_5)_{2.70}(n-C_4H_9)_{6.3}(O-n-Bu)_{2.0}$ was obtained.

Ethylene was polymerized in the same manner as in Example 36 except that the organomagnesium compound obtained above was used. The results are shown in Table 5 below.

EXAMPLES 45-52

Ethylene was polymerized in the same manner as in Example 36 except that organometallic compound components listed in Table 5 were used. The results are shown in Table 5.

pound of titanium, vanadium, hafnium or zirconium, and a germanium compound having the general formula:

$$R^1R^2R^3R^4Ge$$

wherein (i) $R^1$, $R^2$ and $R^3$ are each independently a hydrocarbon group having 1 through 10 carbon atoms, and $R^4$ is a hydrogen atom, a halogen atom, a —OH group, or a —$OGeR^1R^2R^3$ group or (ii) $R^1$, $R^2$, $R^3$ and $R^4$ are each independently —$OR^5$ wherein $R^5$ is a hydrocarbon group having 1 through 10 carbon atoms, or a halogen atom, and a tin compound having the general formula:

$$R^1R^2R^3R^6Sn$$

wherein $R^1$, $R^2$ and $R^3$ are the same as defined above and $R^6$ is a halogen atom, or a —OH group, with (b) at least one chromium compound (I) in the absence of a carrier and then supporting the reaction product on an inorganic oxide carrier, or (II) effecting the reaction in the presence of an inorganic oxide whereby the product forms on the carrier; and, (B) an organometallic compound component selected from the following groups (1) through (5):

(1) a hydrocarbon-soluble organomagnesium component having the general formula:

$$M_\alpha Mg_\beta R^7_p R^8_q X_r Y_s$$

TABLE 5

| Example No. | Starting material for chromium compound component | Amount of Cr supported (wt %) | Organometallic component | Amont used (m mol) | Catalyst activity (g/g · Cr) [Catalyst efficiency g-PE/g solid cat · hr] | MI (g/10-min) | FR |
|---|---|---|---|---|---|---|---|
| 36 | nBu₃N | 0.7 | AlMg₃.₀Et₁.₅nBu₆.₀(OSiHMeEt)₁.₅ | 0.20 | 629,000 [2200] | 0.23 | 140 |
| 37 | iBu₂NH | 0.7 | " | " | 574,000 [2020] | 0.20 | 145 |
| 38 | nHexNH₂ | 1.0 | " | " | 400,000 [2000] | 0.22 | 148 |
| 39 |  | 1.0 | " | " | 324,000 [1620] | 0.52 | 120 |
| 40 | (Me₂N)₃PO | 0.7 | " | " | 509,000 [1780] | 0.30 | 123 |
| 41 | nBu₃N | " | " | 0.10 | 571,000 [2000] | 0.17 | 150 |
| 42 | " | " | AlMg₆.₀Et₁.₀nBu₁₂.₀(OSiHMeEt)₂.₀ | 0.20 | 600,000 [2100] | 0.21 | 145 |
| 43 | " | " | AlMg₆.₀Et₃.₀nBu₁₂.₀ | " | 474,000 [1660] | 0.01 | — |
| 44 | nBu₃N | 0.7 | AlMg₄.₀Et₂.₇nBu₆.₃(ONBu)₂.₀ | 0.20 | 537,000 [1880]/ | 0.16 | 147 |
| 45 | " | " | AlEt₂.₀(OSiHMeEt)₁.₀ | " | 451,000 [1580] | 0.90 | 90 |
| 46 | nBu₃N | " | iBuMgnBu | " | 432,000 [1510] | 0.01 | — |
| 47 | " | " | BMgEt₂.₈nBu₂.₂ | " | 438,000 [1530] | 0.02 | — |
| 48 | " | " | BeMgEt₂.₁nBu₂.₉ | " | 442,000 [1550] | 0.01 | — |
| 49 | " | " | ZnMg₂.₀Et₂.₁nBu₃.₉ | " | 455,000 [1590] | 0.01 | — |
| 50 | " | " | Li₂MgiPr₂nBu₂ | " | 463,000 [1620] | 0.03 | — |
| 51 | " | " | nBuLi | " | 512,000 [1790] | 0.005 | — |
| 52 | " | " | Et₂Zn | 0.40 | 287,000 [1000] | 0.15 | 150 |

We claim:

1. A catalyst for polymerizing olefins comprising:
(A) a solid catalyst component obtained by calcining a product produced by reacting (a) at least one compound selected from an amine compound, a phosphoric acid amide, a hydrocarbyloxy comwherein M is an element selected from aluminum, boron, beryllium, zinc and lithium; $R^7$ and $R^8$ are the same or different hydrocarbon groups having 1 to 20 carbon atoms; X and Y are the same or different groups selected from $OR^9$, $OSiR^{10}R^{11}R^{12}$, $NR^{13}R^{14}$, or $SR^{15}$ wherein $R^9$, $R^{10}$, $R^{11}$, $R^{12}$, $R^{13}$, and $R^{14}$ are each independently a hydrogen atom, or a hydrocarbon group having 1 to 20 carbon atoms, and $R^{15}$ is a hydrocarbon group having 1 to 20 carbon atoms; $\alpha$ is zero or greater than zero, $\beta$ is greater than zero and p, q, r, and s are each zero or greater than zero and both p and q are not zero at the same time and have the relationship $p+q+r+s=m\alpha+2\beta$ wherein m has a valency of M;

(2) an organoaluminum component obtained by reacting (i) one mole of a trialkylaluminum compound with (ii) 0.1 to 2 moles of a carbinol having 1 to 10 carbon atoms, 0.1 to 5 moles of a silanol or siloxane, or a mixture thereof;

(3) a component comprising said hydrocarbon-soluble organomagnesium component (1) and said organoaluminum component (2);

(4) a component comprising said hydrocarbon-soluble organomagnesium component (1) and an organoboron, organozinc, or organolithium compound; and (5) a component comprising said organo-aluminum component (2) and an organoboron, organozinc, or organolithium compound.

2. A catalyst as claimed in claim 1 wherein the inorganic oxide carrier is silica or silica-alumina.

3. A catalyst as claimed in claim 1 or 2 wherein the inorganic oxide carrier has a surface area of 300 m²/g or more and a specific pore volume of 1 ml/g or more.

4. A catalyst as claimed in claim 1 or 2 wherein the reaction product of the component (A) is that obtained by the reaction of an aliphatic amine and chromium trioxide.

5. A catalyst as claimed in claim 1 or 2 wherein the reaction product of the component (A) is that obtained by the reaction of an aliphatic phosphoric acid triamide compound and chromium trioxide.

6. A catalyst as claimed in claim 1 or 2 wherein the reaction product of the component (A) is that obtained by the reaction of a hydrocarbyloxy compound of titanium, vanadium, hafnium and zirconium and chromium trioxide.

7. A catalyst as claimed in claim 1 or 2 wherein the reaction product of the component (A) is that obtained by the reaction of a germanium compound with chromium trioxide.

8. A catalyst as claimed in claim 1 or 2 wherein the reaction product of the component (A) is that obtained by the reaction of a tin compound with chromium trioxide.

9. A catalyst as claimed in claim 1 or 2 wherein the content of chromium in the solid catalyst component is 0.01 through 5% by weight in terms of the chromium atom.

10. A catalyst as claimed in claim 1 or 2 wherein $\alpha$ and $\beta$ in the general formula of the organomagnesium compound are $\alpha > 0$ and $\beta/\alpha \geq 0.2$.

11. A catalyst as claimed in claim 1 or 2 wherein $\alpha$ and $\beta$ in the general formula of the organomagnesium compound are $\alpha < 0$ and $\beta/\alpha \geq 0.5$.

12. A catalyst as claimed in claim 1 or 2 wherein X and Y in the general formula of the organomagnesium component are each independently $OR^9$ or $OSiR^{10}R^{11}R^{12}$.

13. A catalyst as claimed in claim 1 or 2 wherein $\alpha, \beta$, r and s in the general formula of the organomagnesium compound are $0 \leq (r+s)/(\alpha+\beta) \leq 1$.

14. A catalyst as claimed in claim 1 or 2 wherein $\alpha$, $\beta$, r and s in the general formula of the organomagnesium compound are $0 \leq (r+s)/(\alpha+\beta) \leq 0.8$.

15. A catalyst as claimed in claim 1 or 2 wherein X in the general formula of the organomagnesium compound is an $OSiR^{10}R^{11}R^{12}$ group wherein $R^{10}$, $R^{11}$, and $R^{12}$ are each independently a hydrogen atom or a hydrocarbon group having 1 to 20 carbon atoms.

16. A catalyst as claimed in claim 1 or 2 wherein X in the general formula of the organomagnesium compound is an $OSiR^{10}R^{11}R^{12}$ group wherein $R^{10}$ is a hydrogen atom or $R^4$, $R^5$, $R^6$ are each independently a hydrocarbon group having 1 to 7 carbon atoms.

17. A catalyst as claimed in claim 1 or 2 wherein X in the general formula of the organomagnesium compound is an $OSiR^{10}R^{11}R^{12}$ group wherein $R^{10}$ is a hydrogen atom and $R^{11}$ and $R^{12}$ are each independently a hydrocarbon group selected from methyl, ethyl, propyl, butyl, amyl, hexyl, phenyl, or tolyl.

18. A catalyst as claimed in claim 1 or 2 wherein the organoaluminum compound (B) is that obtained by the reaction of 1 mol of trialkylaluminum with 0.1 through 2 moles of silanol or siloxane.

19. A catalyst as claimed in claim 1 or 2 wherein the organoaluminum compound is that obtained by the reaction of 1 mole of trialkylaluminum with 1.5 moles of carbinol.

20. A catalyst as claimed in claim 1 or 2 wherein the organometallic compound contains a Si-H linkage therein.

21. A catalyst as claimed in claim 1 or 2 wherein the organometallic compound contains 0.1 to 2 moles of a silicon group per 1 gram atom of the metal atom in the component (B).

22. A catalyst as claimed in claim 1 or 2 wherein the solid catalyst component (A) is brought into contact with a small amount of the component (B) prior to the usage thereof.

* * * * *